United States Patent [19]
Gish et al.

[11] Patent Number: 6,047,725
[45] Date of Patent: Apr. 11, 2000

[54] ADJUSTABLE HEIGHT FILL VALVE

[75] Inventors: Larry D. Gish, Robards, Ky.; Tim A. Frick, Strongsville, Ohio; Ross E. Kingman, Elyria, Ohio; Edward D. Kastelic, Sheffield Village, Ohio

[73] Assignee: Moen Incorporated, North Olmsted, Ohio

[21] Appl. No.: 09/294,061

[22] Filed: Apr. 19, 1999

[51] Int. Cl.[7] .............................. F16K 31/34; F16K 33/00
[52] U.S. Cl. ..................... 137/426; 137/218; 137/414; 137/432; 137/437
[58] Field of Search .................... 137/218, 413, 137/414, 426, 430, 432, 436, 437

[56] References Cited

U.S. PATENT DOCUMENTS

| | | | |
|---|---|---|---|
| D. 245,172 | 7/1977 | Schoepe | D23/40 |
| D. 292,120 | 9/1987 | Nestich | D23/19 |
| 2,619,122 | 11/1952 | Hunter | 137/414 |
| 2,770,250 | 11/1956 | Smith | 137/426 |
| 3,534,830 | 10/1970 | Kalla | 137/436 |
| 4,108,202 | 8/1978 | Schoepe | 137/436 |
| 4,182,364 | 1/1980 | Gilbert et al. | 137/426 |
| 4,286,619 | 9/1981 | Straus | 137/426 |
| 4,340,082 | 7/1982 | Straus | 137/426 |
| 4,431,024 | 2/1984 | Gallagher | 137/413 |
| 4,574,826 | 3/1986 | Johnson | 137/426 |
| 4,589,688 | 5/1986 | Johnson | 285/12 |
| 4,600,031 | 7/1986 | Nestich | 137/218 |
| 4,646,779 | 3/1987 | Johnson | 137/426 |
| 4,765,363 | 8/1988 | Pi-Yu | 137/414 |
| 4,945,944 | 8/1990 | Chen | 137/403 |
| 5,007,452 | 4/1991 | Antunez | 137/441 |
| 5,035,257 | 7/1991 | Antunez | 137/414 |
| 5,255,703 | 10/1993 | Johnson | 137/428 |
| 5,280,803 | 1/1994 | Swift et al. | 137/414 |
| 5,287,882 | 2/1994 | Mikol | 137/410 |
| 5,337,781 | 8/1994 | Johnson | 137/434 |
| 5,421,361 | 6/1995 | Johnson | 137/414 |
| 5,439,025 | 8/1995 | Johnson | 137/426 |
| 5,623,961 | 4/1997 | Nichols-Roy | 137/377 |
| 5,715,859 | 2/1998 | Nichols-Roy | 137/426 |
| 5,904,176 | 5/1999 | Li | 137/426 |
| 5,964,247 | 10/1999 | Johnson | 137/426 |

*Primary Examiner*—George L. Walton
*Attorney, Agent, or Firm*—Dorn, McEachran, Jambor & Keating

[57] ABSTRACT

An adjustable height fill valve for controlling the water level in a storage tank for a toilet includes a riser mounted in the tank and connected to a pressurized water supply. The riser includes an anti-siphon body telescopically mounted over a fixed shank. The anti-siphon body telescopically adjusts between retracted and extended positions. A pilot valve is mounted on the anti-siphon body in fluid communication with the water supply. A float is mounted in association with the pilot valve to selectively open or close the pilot valve depending on the water level in the tank. A latch on the anti-siphon body and a series of stops on the shank are releasably engageable to adjustably fix the position of the body on the shank between the retracted and extended positions. The stops comprise first and second sets of axially spaced and interleaved fingers which define a serpentine track into which the latch extends.

10 Claims, 5 Drawing Sheets

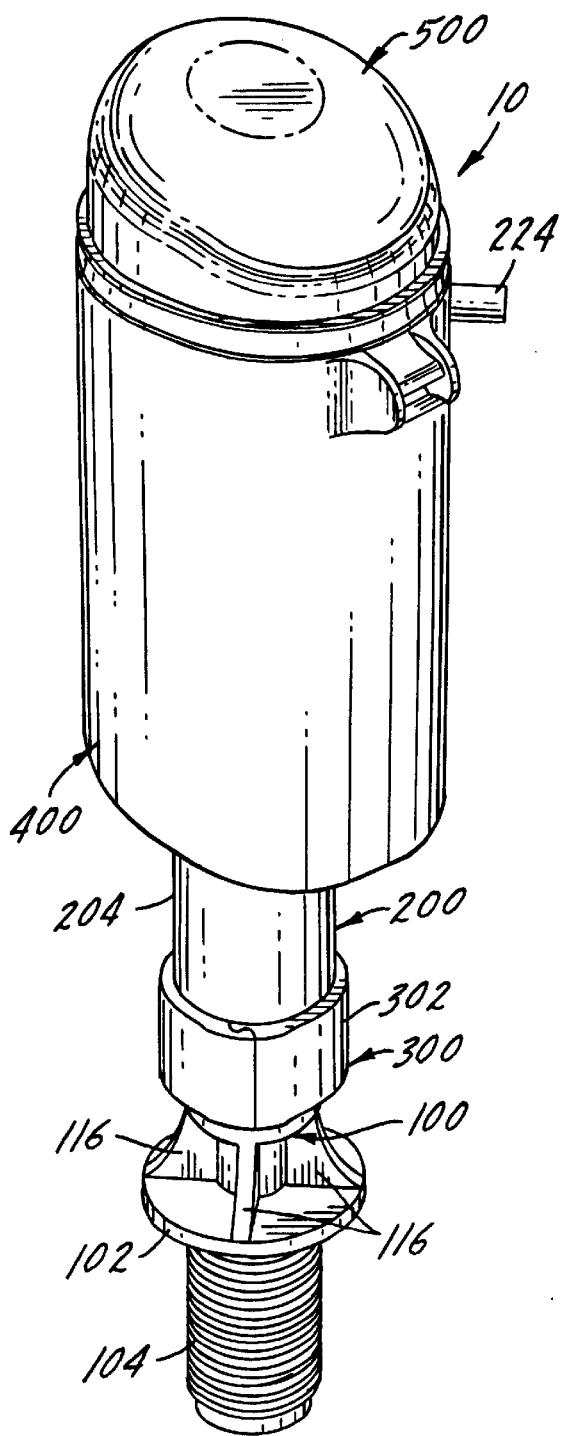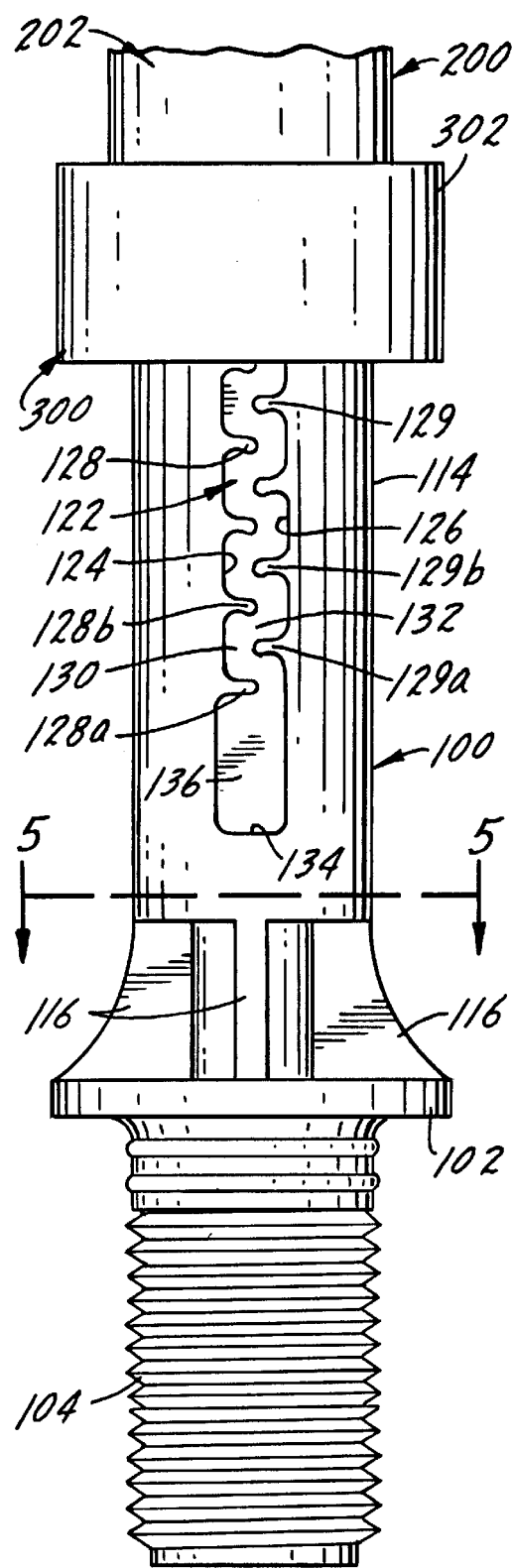

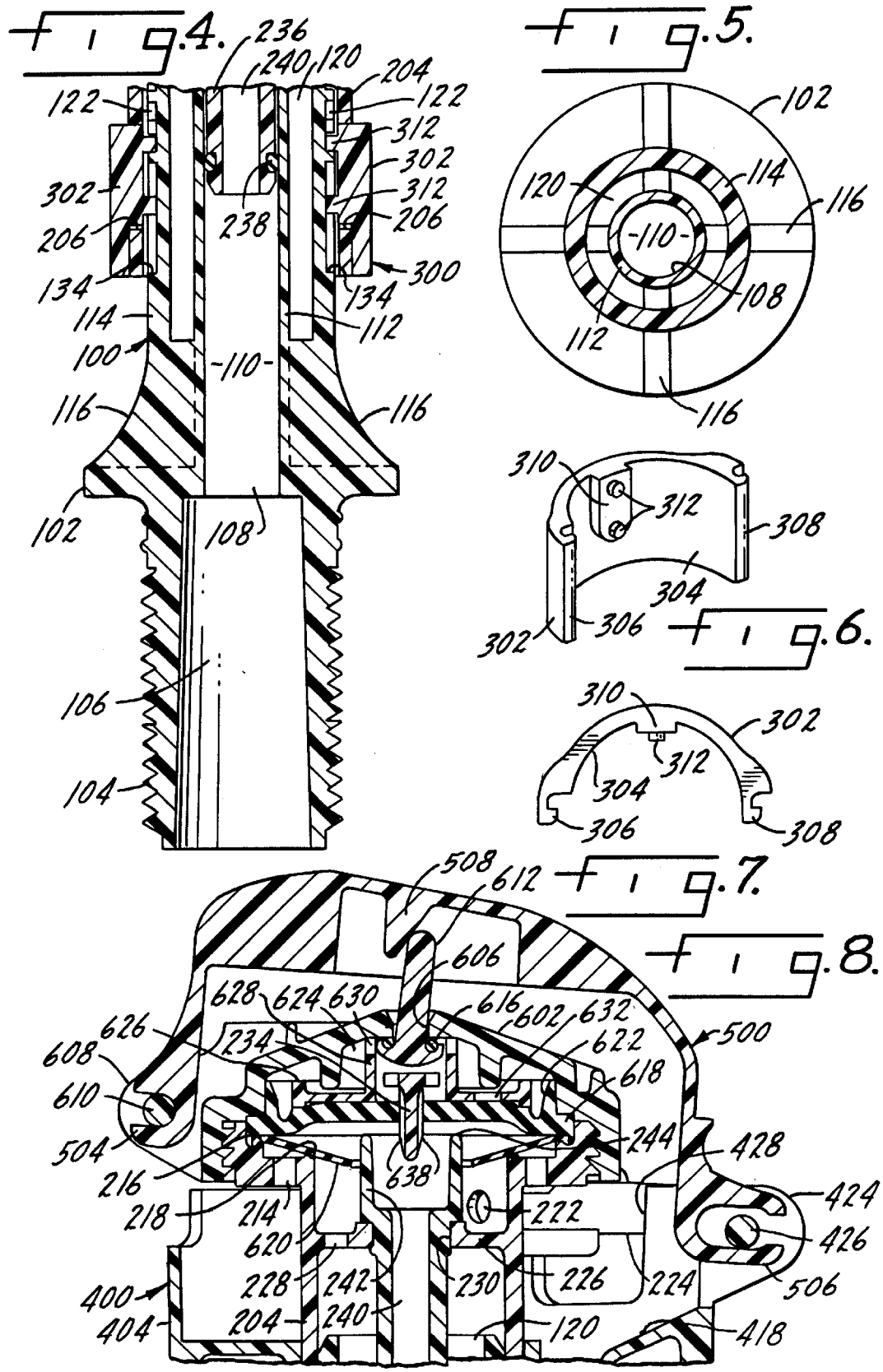

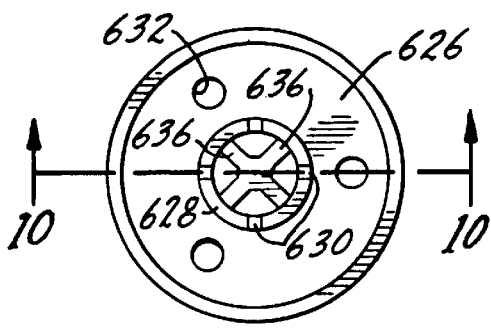
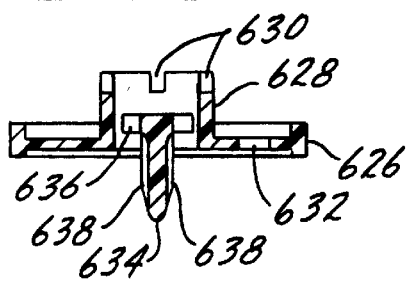
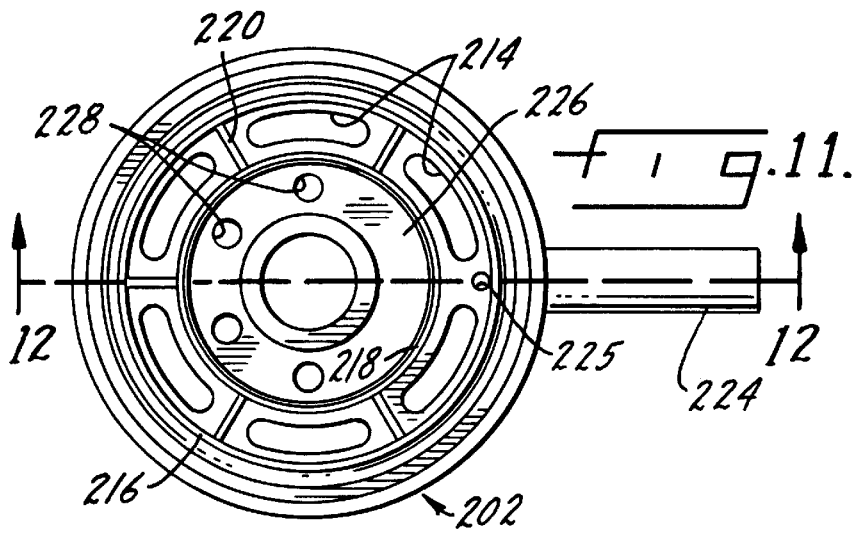
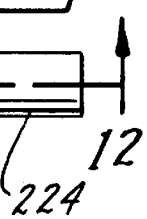
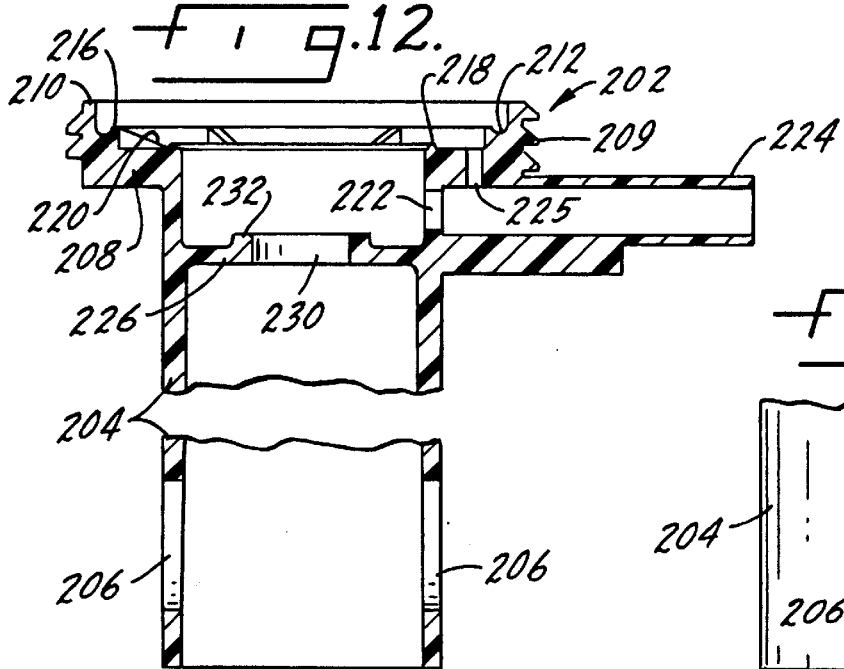
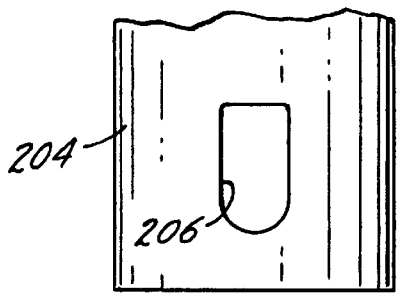

ADJUSTABLE HEIGHT FILL VALVE

BACKGROUND OF THE INVENTION

This invention relates to an improved, adjustable height fill valve for use in gravity flush toilets.

Conventional gravity flush toilets have a generally rectangular tank mounted immediately above a bowl. A water passage connects the tank and bowl through a drain outlet in the bottom of the tank. A flapper valve normally closes the drain outlet. When a user actuates the flush handle on the outside of the tank, the flapper valve is lifted and the water in the tank flows through the drain outlet into the bowl, which flushes the contents of the bowl into the sewer system. When the water level in the tank drops, the flapper valve recloses on the drain outlet and the fill valve is opened to permit refilling of the tank from a water supply line.

The typical fill valve comprises a pilot valve mounted in the tank on top of a riser which connects through an opening in the bottom of the tank to a pressurized water supply line. A float connected to the pilot valve rises and falls with the water level in the tank. When the water level falls, the pilot valve is activated and permits refilling of the tank. A portion of the water flowing through the pilot valve is diverted to an overflow tube through which the bowl is refilled to the normal standing water level therein. When the water level in the tank carries the float to a predetermined height, the pilot valve is shut off and the system is ready for the next flush.

In order to make the fill valve adaptable for the widest variety of tank sizes and shapes, its height should be adjustable. This has been done by making the riser out of two or more telescoping tubes with the pilot valve mounted on top of one of these tubes. Examples of this arrangement are found in U.S. Pat. Nos. 5,255,703 and 5,715,859. In this prior art, height adjustments are made by rotating the tubes relative to one another to disengage a locking mechanism. Once the lock is disengaged, the tubes can be moved axially to the full extent of the tubes. Once the desired height is obtained, the tubes are again rotated to re-lock them at the chosen height.

One of the disadvantages of the prior art is that the user must remember to take a positive step to re-lock the height adjustment. That is, once the locking mechanism is disengaged it remains disengaged until some positive action is taken to reengage the lock. If this reengagement step is not performed or is performed in a faulty manner, the tubes are subject to coming apart.

Another design consideration in valves of this type is the location of the float. From a space utilization standpoint it is preferable to locate the float on or about the riser. However, this can create problems in obtaining reliable valve opening when the float falls. Floats filled only with air can be too light to assure enough force to open the valve. One common way to handle this problem is to place the float on the end of an elongated arm to increase the moment about a pivot point on the valve. This has the disadvantage of greatly increasing the space required for the valve. Another approach has been to locate the float about the riser and increase its weight, and therefore its closing force, by partially filling it with water. U.S. Pat. Nos. 5,035,257, 4,600,031 and 5,287,882 are examples. The water chambers in these patents are substantially symmetrical about the riser. This arrangement is functionally adequate but can lead to manufacturing difficulties that result in a two-piece float.

Still another problem in fill valve design is how to provide anti-siphon vents. The potential for siphoning water from the tank into the water supply exists in the event of a failure of the supply line pressure during a flush sequence. To prevent contamination of the supply line, negative pressure in the supply line has to be broken by anti-siphon vents. During normal operation; however, these vents are closed off to foreclose an undesirable flow path. Conventionally these vents are located in a cap of the pilot valve which tends to increase the size of the valve.

SUMMARY OF THE INVENTION

The present invention relates to an adjustable height fill valve for controlling the water level in a storage tank such as a toilet tank. The valve includes a riser mounted in the tank and connected to a pressurized water supply. The riser includes an anti-siphon body telescopically mounted over a fixed shank. A latch on the anti-siphon body releasably engages a series of stops on the shank. The latch and stops are arranged such that upon release of the latch from one stop it is movable only as far as the next adjacent stop, either up or down. A release motion must be applied at each successive stop. A pilot valve is mounted on top of the anti-siphon body. It is in fluid communication with the water supply so as to start or stop the flow of water according to the position of a float mounted in association with the pilot valve. The float selectively opens or closes the valve depending on the water level in the tank.

In a preferred embodiment, the stops comprise a series of interleaved fingers which define a serpentine track into which a pin fits. The pin can be rotated out of engagement with one finger and then lifted or lowered, as the case may be, to engagement with the next finger. Further axial movement requires a subsequent rotational movement of the pin to advance it past that succeeding stop. The track has fixed upper and lower ends which prevent release of the pin from the track. Through this arrangement the height is adjustable only with a positive releasing action at every stop and without a required locking action to fix the anti-siphon body at a particular stop.

The float is mounted about the riser with a water chamber centered on one side of the float. Placing an air chamber on the other side of the float allows for a construction that can be made in one piece.

Anti-siphon vents are provided adjacent to a husher tube to minimize the width required for the pilot valve.

BRIEF DESCRIPTION OF THE DRAWINGS

FIG. 1 is a perspective view of the fill valve of the present invention, showing the valve in the fully lowered position.

FIG. 2 is a side elevation view of the lower portion of the riser's shank and anti-siphon body, with the anti-siphon body in a partially raised position.

FIG. 4 is a section through the bottom portion of the riser showing the shank, anti-siphon body and clip.

FIG. 5 is a section taken along line 5—5 of FIG. 2.

FIG. 6 is a perspective view of a clip half.

FIG. 7 is a plan view of a clip half.

FIG. 8 is a section similar to FIG. 3, showing the pilot valve in an open condition.

FIG. 9 is a plan view of the guide pin plate.

FIG. 10 is a section along line 10—10 of FIG. 9.

FIG. 11 is a plan view of the anti-siphon body.

FIG. 12 is a section taken along line 12—12 of FIG. 11.

FIG. 13 is a side elevation view of the bottom portion of the anti-siphon body.

DETAILED DESCRIPTION OF THE INVENTION

Figure 3:
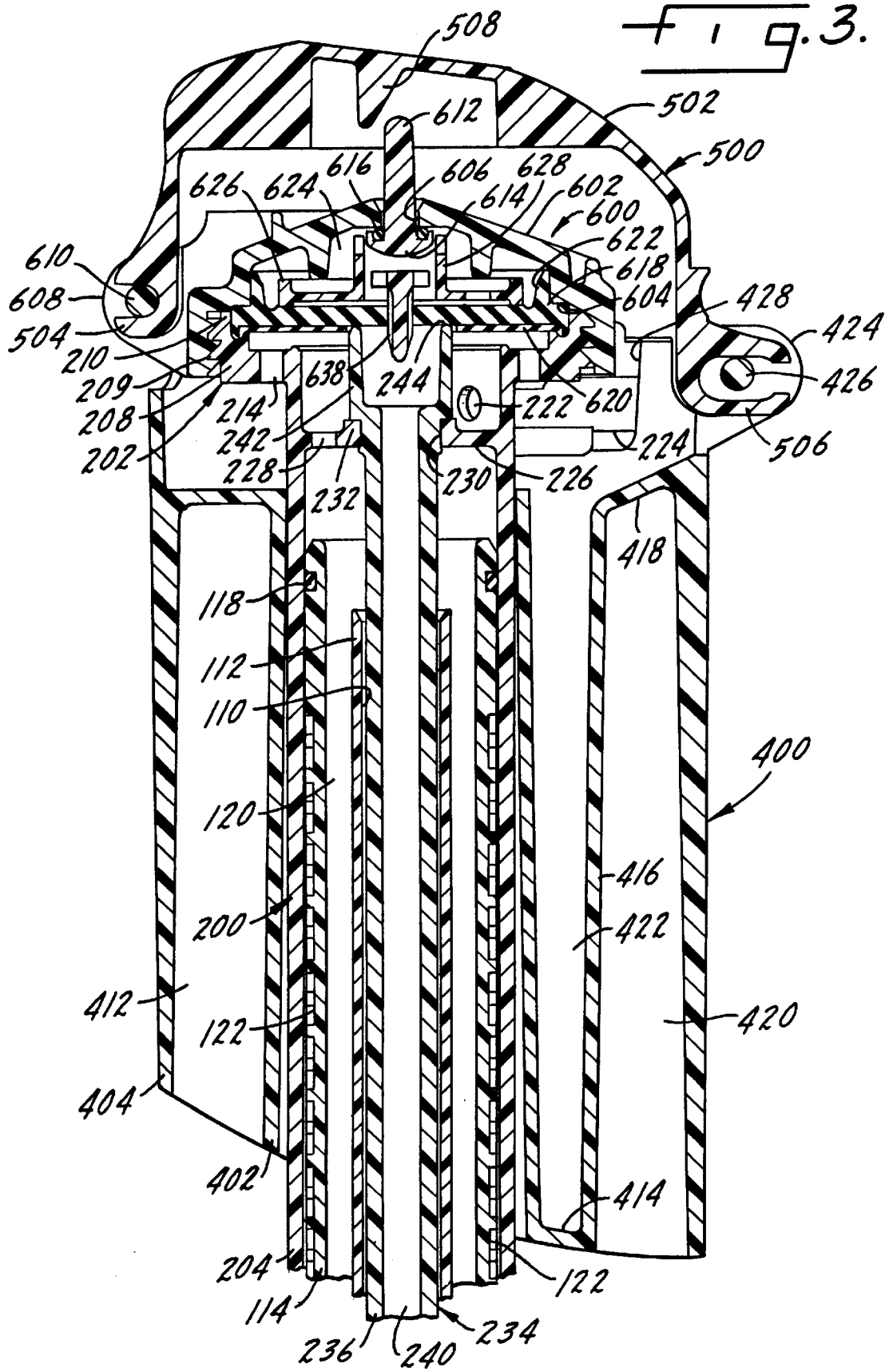
FIG. 3 is an enlarged sectional view showing the upper end of the fill valve, including the cover, cap, float and a closed pilot valve.

The fill valve of the present invention is shown generally at 10 in FIG. 1. The fill valve has several major components, most of which are visible in FIG. 1. These include a riser which has a fixed portion or shank 100 and a telescoping portion 200 connected to the shank 100 by a latch in the form of clip 300. Much of the riser is obscured in FIG. 1 by a float 400 and a cover 500. The other major component, a pilot valve 600, is not visible in FIG. 1 because it is underneath the cover and float. In the following description, subparts of the major components share the first digit of the three digit reference numeral.

Details of the riser's fixed portion or shank 100 are shown in FIGS. 2–5. The shank has a circular base 102 which when installed rests on a rubber washer (not shown) that rests on the interior bottom surface of the tank (not shown). A threaded nipple 104 depends from the base and extends through an opening in the bottom of the tank. The nipple is connectable to a pressurized water supply line. Water flows through a passage 106 in the nipple to a port 108 in the base 102. The port 108 is in fluid communication with a central passage 110 which is defined by an inner tube 112. The tube 112 is joined to the base 102. Surrounding the tube 112 is a sleeve 114. The sleeve is concentrically mounted with respect to the tube by four curved braces 116. The braces are integrally molded in the base 102 and outside surface of the inner tube 112 and support the bottom of the sleeve 114. As seen in FIG. 3, the top of the sleeve 114 extends slightly above the top of the tube 112. The outer surface of the sleeve has a groove near its top to receive an O-ring seal 118. Together the sleeve 114 and inner tube 112 define a channel 120 between them. The channel 120 is open at the top and at the bottom to allow water to flow through it.

The outer surface of the sleeve 114 has a pair of height adjustment tracks shown generally at 122. The tracks 122 are located on opposite sides of the sleeve. Preferably the tracks are recessed into the wall thickness of the sleeve. Alternately, the tracks could be defined by walls protruding from the surface of the sleeve.

Details of the track are shown in FIG. 2. The tracks have first and second axial walls 124, 126. These are spaced apart as shown. The walls define an axially extending channel. This channel is partially interrupted by a series of stops in the form of interleaved sets of fingers indicated collectively by reference numerals 128 and 129. Individual fingers will be further referenced by letter designations. Fingers 128 extend from wall 124 and fingers 129 extend from wall 126. The fingers extend partially across the channel leaving a gap 130 between the free end of the finger and the opposite wall. As shown in FIG. 2, the fingers are alternately positioned on opposite walls so that they form an interleaved structure which imparts an overall serpentine arrangement to the channel. The axial spacing between successive fingers of opposite sets defines a horizontal slot 132. It will be noted that the underside of each finger has a slightly arcuate configuration for accepting a rounded pin as will be explained below. The tracks 122 terminate at a bottom wall 134 and a corresponding top wall. Thus, the tracks are closed-ended. It will also be noted that at the bottom of the track there is a somewhat lengthened portion 136 that does not have any fingers 128, 129. This installation portion 136 permits assembly of the anti-siphon body 202 on the shank without interference between pins on the clip 300 and the fingers. This will be explained further below.

Turning now to FIGS. 3 and 11–13, details of the telescoping portion 200 of the riser will be described. The telescoping portion includes an anti-siphon body 202. Anti-siphon body 202 has an elongated cylindrical sleeve 204 which fits telescopically over the exterior of the shank's sleeve 114. The sleeve 204 is sealed on its inner surface by the O-ring 118 in the sleeve 114. The anti-siphon body 202 is movable up and down on the sleeve 114 to adjust the overall height of the fill valve. Together the sleeves 204 and 114 form what is sometimes referred to as a husher tube.

At the bottom of the sleeve 204 are two shield-shaped windows 206 (FIGS. 12 and 13). They are generally rectangular except for a curved bottom edge. These windows 206 extend fully through the wall thickness of the sleeve 204.

Integrally molded on the top edge of the sleeve 204 is a radially extending platform 208. The exterior edges of the platform are threaded as at 209. An upstanding annular lip 210 surrounds the outside edge of the platform. Just inside the lip there is a circular groove 212. Located interiorly of the groove 212 are a series of vent openings 214. As best seen in FIG. 11, the vents 214 have an arcuate oval shape. The vents are generally surrounded on the upper surface of the platform by seating surfaces for an anti-siphon diaphragm. These seating surfaces include concentric circular portions 216, 218 joined by radial portions 220. The seating portion 218 is actually formed on the top land of the sleeve 204.

Just below the platform 208 an outlet port 222 is cut through the wall of the sleeve 204. The port 222 communicates with a radially-extending conduit 224. The conduit connects to a fill tube (not shown) for refilling the toilet bowl in the conventional manner. A venthole 225 extends through the platform into the conduit 224.

Recessed somewhat from the top land of the sleeve 204 and below the port 222 is a stem support ledge 226. The ledge has four ports 228 (FIG. 11) spaced around one half of its surface. A central bore 230 extends through the ledge. An upstanding shoulder 232 surrounds the bore. The ledge 226 supports the other part of the telescoping portion 200 of the riser, namely, a stem 234. As seen in FIGS. 3 and 4, the stem has an elongated tube 236 that fits through the bore 230 of the ledge 226 and into the inner tube 112 of the shank. Thus, the stem 234 is supported at its upper end by the ledge 226 and at its lower end by the shank's tube 112. An O-ring 238 (FIG. 4) fits within a groove at the bottom of the tube 236 for sealing against the inner walls of tube 112. The stem's tube 236 defines a water inlet passage 240 through its center. Passage 240 is in fluid communication with the inlet passage 106 of the shank 100. At the top of the stem is an enlarged bowl 242, the underside of which rests on the shoulder 232 of the anti-siphon body's ledge 226. The top of the bowl 242 extends above the seating portion 218 of the sleeve 204. The top land of the bowl forms a valve seat 244.

It will be noted that by recessing the upper stem support ledge 226 within the sleeve 204, the top land and exterior periphery of the sleeve are left unobstructed. This permits placement of the anti-siphon vents 214 and their associated diaphragm directly adjacent the top of the sleeve which in turn provides a compact structure that will fit in a greater variety of tank sizes.

The clip 300 serves as a latch engageable with both the anti-siphon body 202 and the shank 100 to adjustably fix the position of the telescoping portion 200 on the shank. As seen in FIG. 1, the clip 300 surrounds the base of the sleeve 204 of the anti-siphon body 202. This surrounding structure is made from two identical clip halves 302. As seen in FIGS. 6 and 7 each clip half includes an arcuate band 304 which terminates at couplers 306 and 308. Each coupler has a groove and hook which are engageable with the similar portions of a mating half to form an interlocking hoop structure as shown in FIG. 1. The bands 304 of mating halves are sufficiently flexible to permit the hooks to flex into engagement with a mating groove. Intermediate to the couplers is a boss 310. The boss is a shield-shaped protrusion from the interior surface of the band. It protrudes a distance approximately equal to the wall thickness of the sleeve 204. The boss 310 fits into a window 206 on the sleeve as best seen in FIG. 4. Extending from the surface of the boss are two pins 312. The pins are spaced apart about the distance between succeeding fingers of one of the sets of fingers 128 or 129. That is, the spacing is the same as that of fingers 128a and 128b. The pins 312 extend into the channel formed by the tracks 122. The diameter of the pins is slightly less than the gaps 130 in the track but slightly more than the slots 132. Thus, the pins freely move up and down or axially in the track but the fingers and/or pins must flex through some slight resistance when the sleeve 204 is rotationally moved on the shank.

Assembly of the anti-siphon body 202 and shank 100 is as follows. The anti-siphon body is placed down over the top of the sleeve 114 until the windows 206 are generally aligned with the installation portion 136 of the track 122. Then two clip halves 302 are placed around the base of the sleeve 204 with the bosses 310 fitting into the windows 206. The mating couplers 306, 308 are pressed together until the hooks of one coupler engage the grooves of its opposite number thereby locking the clip 300 onto the anti-siphon body 202. Due to the absence of fingers 128, 129 in the installation portion 136 of the tracks 122, the exact location of the anti-siphon body relative to the shank is not critical as there will be no interference between the pins and a finger at this location. After the anti-siphon body 202 and shank 100 are thus connected, the stem 234 can be placed through the bore 230 and into the inner tube 112.

The height adjustment of the riser is as follows. Since the pins 312 extend into the channel formed by the tracks 122, axial movement of the telescoping portion 200 relative to the fixed portion 100 will require the pins to follow the serpentine shape of the track. Thus, the anti-siphon body 202 is rotated to position with the pins against the right axial wall 126 as seen in FIG. 2. The body 202 can then be raised until the upper pin engages the first finger 129a. Further raising of the anti-siphon body will require that it be rotated to the left so as to move the pin through the first slot between fingers 128a and 129a. Once this rotation is achieved, a further longitudinal or axial movement can raise the top pin until it engages the underside of finger 128b. At this time, the lower pin will engage the underside of finger 128a. Now further axial movement will require first a rotational movement to the right, freeing the pins from fingers 128 and allowing them to move upwardly until they engage fingers 129b and 129a respectively. Further height adjustment will continue in this manner of rotate, then pull to increase the height (or rotate and push to reduce the height). When the anti-siphon body 202 is subjected to the water pressure in the supply line, it will be biased upwardly with respect to the shank. This will cause the pins 312 to engage the underside of an adjacent pair of fingers. The circular pins will nestle against the arcuate underside of the fingers. That interfitting relation together with the slight interference between the pins and the slots 122 will prevent unwanted rotation of the anti-siphon body on the shank.

It can be seen with this arrangement that only limited axial movement is possible without an intervening rotational movement. The anti-siphon body has to be worked back and forth to move the pins through the serpentine track. As a result, the telescoping portion 200 can never be moved to a position where it is completely unlocked and capable of coming off the shank 100. This means that no positive locking step must be performed once the clip is assembled onto the anti-siphon body. In other words, no matter what rotational position the anti-siphon body is left in, it cannot come off of the shank. Further, because the bottom wall 134 and top wall of the track entirely enclose the track, the pins cannot come out of the track and the anti-siphon body cannot be removed from the shank (except through determined, nearly destructive effort to separate the couplers 306, 308 of the clip to remove the clip entirely).

Figure 14:
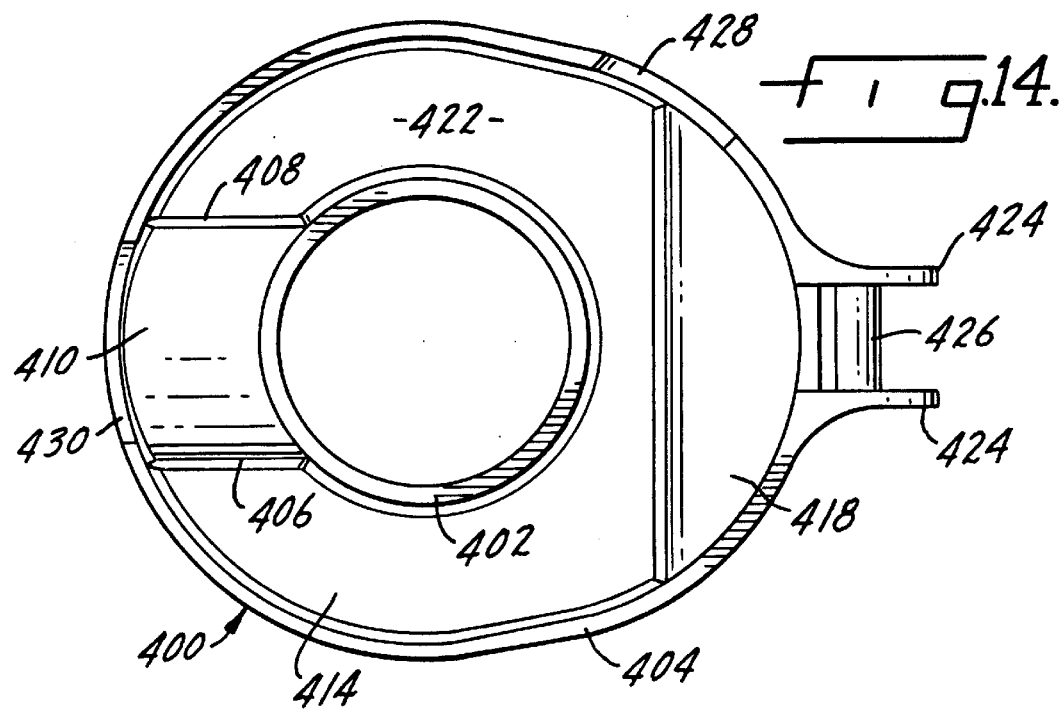
FIG. 14 is a top plan view of the float.
Figure 15:
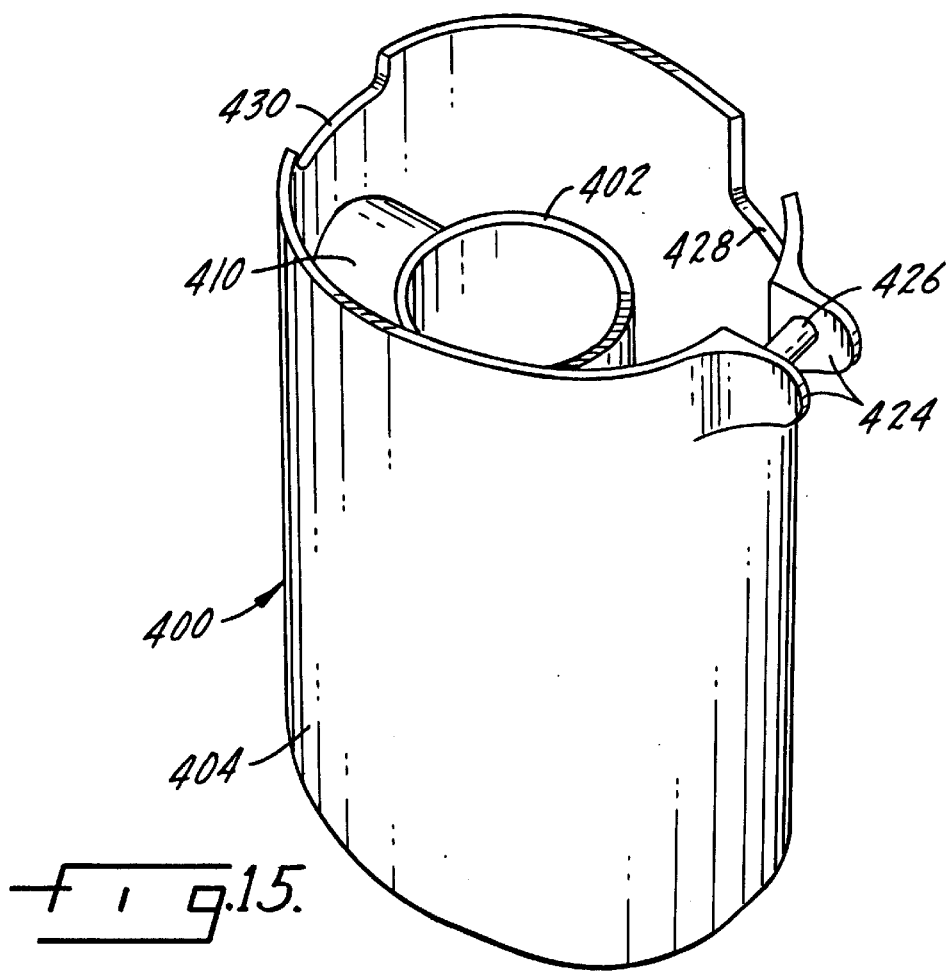
FIG. 15 is a perspective view of the float.

Turning now to the details of the float 400, FIGS. 3, 14 and 15 illustrate the rather complex construction of this member which serves both as a float and a weight. The float includes a central, hollow core 402 which is generally cylindrical but has a rather pronounced taper to permit the part to be molded in one piece. The core 402 closely surrounds the exterior surface of the sleeve 204, although it is always at least slightly spaced therefrom to allow the float to move freely up and down. An exterior annular skirt 404 surrounds the core 402 and defines a circumferential volume between the core and skirt. The core 402 is joined to the skirt by a pair of vertically extending panels 406 and 408. These panels are joined by a top wall 410. Together the top wall, the panels 406, 408 and portions of the core 402 and skirt 404 define a first air chamber 412. The core 402 is further attached to the skirt by a bottom wall 414. The bottom wall extends from partition 406 around the core to the second partition 408, giving the bottom wall a backwards C-shape as seen in FIG. 14. The right side of the bottom wall is bounded by a vertically extending partition 416. The partition extends from one side of the skirt to the other, somewhat in the nature of a chord. The top of the partition is bounded by a second top wall 418 which joins the skirt as seen in FIG. 3. Together the top wall 418, partition 416 and portions of the skirt define a second air chamber 420. The panels 406 and 408 together with the bottom wall 414, partition 416, opposite sides of the skirt, and a major portion of the core define a water chamber 422.

At the top of the float is a pair of tabs 424 which support a rod 426. Adjacent the tabs is a cutout 428 which accommodates the conduit 224 of the anti-siphon body. Opposite the tabs 424 is a second cutout 430 which provides clearance for the cover support.

It will be noted in FIG. 14 that the water chamber 422 is located between the two air chambers. This allows the float to move straight up and down on the riser while providing a structure that can be molded in one piece.

Looking now at the cover 500 in FIGS. 1 and 3, it includes a dome-shaped lid 502 which is generally hollow on its underside. The outer edges of the lid generally line up with the skirt 404 of the float. The cover has a hinge 504 that engages a pivot pin on the pilot valve such that the cover pivots about the pin. On the opposite side of the cover is a jaw 506 which loosely engages the rod 426 of the float. Interengagement of the pin and jaw causes the cover to pivot about the hinge as the float moves up and down. A projection 508 is formed on the underside of the lid 502 for engagement with a vent pin of the pilot valve as will be described below.

FIG. 3 illustrates the pilot valve 600 in the closed position while FIG. 8 shows it in an open position. The pilot valve includes a cap 602 threaded onto the platform 208. The cap is shaped generally concave downwardly. Cap 602 has internal threads which engage the threads 209 to fix the cap on the anti-siphon body's platform 208. Just inside of the threads the cap has a shoulder 604. At the center of the cap is an opening 606. The exterior of the cap has a pair of extensions 608 that mount a pivot pin 610. The pivot pin engages the hinge 504 of cover 500.

A vent pin resides in the cap opening 606. The vent pin includes a shaft 612 connected to a head 614 placed on the underside of the cap 602. The head 614 mounts a sealing ring 616 between it and the under surface of the cap surrounding the opening 606.

Two diaphragms, a main diaphragm 618 and an anti-siphon diaphragm 620, span most of the area across the top of the platform 208. The main diaphragm is made of hard rubber. The periphery of the main diaphragm 618 fits just inside of the lip 210 of the platform 208. Each diaphragm has a depending, annular flange that fits into the groove 212. The shoulder 604 of the cap 602 clamps both diaphragms to the platform 208. The anti-siphon diaphragm 620 is somewhat bowed, like a bell washer, and it is more flexible than the main diaphragm. The anti-siphon diaphragm 620 has a central opening through which the bowl 242 of the stem 234 extends. When the valve is closed as shown in FIG. 3, the main diaphragm 618 rests against the valve seat 244 to prevent water from flowing through the stem 234. The main diaphragm 618 has a projecting seal 622 which engages one of the interior walls of the cap 602. Together the main diaphragm 618, the cap 602, the vent pin and the sealing ring 616 define a pressure chamber 624.

Disposed within the pressure chamber and on top of the main diaphragm is a guide pin plate 626. This plate is movable with the main diaphragm 618. Details are seen in FIGS. 9 and 10. The guide pin plate has a central upright hub 628 with four slots 630 at the upper edges thereof. Three or more apertures 632 extend through the guide pin plate outboard of the upright hub 628. The hub surrounds the head 614 of the vent pin and will engage the underside of the cap to limit the upward movement available to the main diaphragm 618. A guide pin 634 has four arms 636 attached to the inside of the upright hub 628. These arms allow passage of water through the hub while supporting the shank portion of the guide pin. The shank extends through an aperture in the center of the main diaphragm 618. The shank has a pair of grooves or slots 638 that permit passage of water through the center aperture of the main diaphragm. The purpose of the shank is to clear the aperture of deposits or sediment as the diaphragm moves up and down.

The use, operation and function of the fill valve are as follows. Assuming the valve to have been previously installed and adjusted to its desired height as described above, the valve at rest is in the condition shown in FIG. 3. The water chamber 422 of the float will be filled with water while the air chambers 412 and 420 are filled with air. The size of the chambers are such that the float is buoyant enough to overcome the weight of the water when the tank fills, forcing the float to its upmost position shown in FIG. 3. In this position the projection 508 is spaced from the vent pin so the vent pin sits upright in the cap opening 606, allowing the sealing ring 616 to close off the opening 606. Thus, the pressure chamber 624 is closed except for its exposure to incoming line pressure through the stem's inlet passage 240 and the main diaphragm aperture. The main diaphragm is sized to have a greater area on its upper surface exposed to the pressure chamber 624 than the area on its bottom surface exposed to the line pressure. With equal pressure on both sides, the greater top side area results in a downward force on the diaphragm that moves it to its closed position as shown in FIG. 3. When closed the main diaphragm 618 seals against valve seat 244 and prevents flow through the pilot valve 600.

When a user flushes the toilet, the tank empties and the weight of the water in the chamber 422 pulls the float down. The connection of the float rod 426 to the cover jaw 506 causes the cover 500 to pivot about the pivot pin 610. As a result of the cover's pivoting motion, the projection 508 engages the shaft 612 of the vent pin, causing it to tilt or cant within the opening 606 of the cap 602. See FIG. 8. This relieves the pressure in the pressure chamber 624 such that the pressure of the incoming water supply within the water inlet passage 240 and the interior of the bowl 242 flexes the main diaphragm upwardly and off of the valve seat 244. The inrushing water gets between the main diaphragm 618 and the anti-siphon diaphragm 620 and forces them apart. Thus, the anti-siphon diaphragm 620 flexes downwardly against the seating portions 218 and 220 of the anti-siphon body. This closes off the vents 214 and 225 and prevents water from flowing through them. Water flows through the inlet passage 240 into the top of the anti-siphon body, around the exterior of the bowl 242. A portion, approximately 25%, of the water flows out the outlet port 222 and into the conduit 224. A fill tube (not shown) extends from conduit 224 to an overflow tube in the tank which in turn is connected to the toilet bowl to refill the bowl after the flush. The remaining 75% of the flow goes through the ports 228 of ledge 226 in the anti-siphon body sleeve 204. From there, the water enters into the channel 120 of the shank. Thus, the water flows down between the inner tube 112 and sleeve 114 and out the openings at the base of the shank and into the tank.

As the tank fills the water level will reach the bottom of the float and close off the bottom openings of the air chambers 412 and 420. This prevents escape of air from those chambers and as the water level rises, the buoyancy in the chambers will cause the float to move upwardly. As the float reaches its uppermost position, it moves the cover 500 back to its rest position which carries the projection 508 out of engagement with the vent pin. A portion of the water flowing through the stem 234 also flows through the central aperture in the main diaphragm 618, past the guide pin 634 and into the pressure chamber 624. The apertures 632 in the guide pin plate 626 further permit flow of water into the chamber, as do the slots 630 in the guide pin hub 628. As pressure builds in the pressure chamber 624 after reseating of the vent pin, the diaphragm 618 is forced back down onto the seat 244 to close off the incoming water flow. The incoming water pressure will still be applied to the pressure chamber, keeping it pressurized until the vent pin is again canted to release the pressure in the chamber 624.

Closure of the main diaphragm also removes the pressure on the anti-siphon diaphragm allowing its natural resilience to return it to the rest position shown in FIG. 3. In the event of a failure that creates a potential for back siphoning water into the supply line connected to the nipple 104, the anti-siphon diaphragm 620 would release from the seat 218. This would allow air in through the vents 214 to break the vacuum and prevent such back siphoning from occurring.

While a preferred form of the invention has been shown and described, it will be realized that modifications could be made thereto without departing from the scope of the following claims. For example, the latch could be provided by any arrangement that requires the user to take a positive action to allow movement past each stop so that there is no need for a positive locking step to be taken after release of the latch from a first stop.

We claim:

1. An adjustable height fill valve for controlling the water level in a storage tank, comprising:

shank mounted in the tank and connectable to a water supply;

an anti-siphon body telescopically mounted on the shank and axially adjustable between retracted and extended positions or positions intermediate the retracted or extended positions;

a pilot valve mounted on the anti-siphon body in fluid communication with the water supply;

a float mounted in association with the pilot valve to selectively open or close said valve depending on the water level in the tank; and a latch on one of the shank and anti-siphon body and a series of axially-spaced stops on the other of the shank and anti-siphon body, the latch and stops being releasably engageable with one another to adjustably fix the axial position of the body on the shank between said retracted, extended or intermediate positions, the latch upon release from one stop being axially movable only as far as an adjacent stop where another releasing movement is required to effect any further axial movement.

2. The fill valve of claim 1 wherein the series of stops comprises first and second spaced axial walls, first and second sets of fingers extending from the first and second axial walls respectively, the fingers of each set being axially spaced from one another and interleaved with the fingers of the other set, the two sets of interleaved fingers defining a serpentine track into which the latch extends.

3. The fill valve of claim 2 wherein the latch comprises a band surrounding the anti-siphon body, the anti-siphon body having at least one window therethrough and the band having a pin extending through the window into the track.

4. The fill valve of claim 3 wherein the axial spacing of adjacent first and second fingers is about the same as the size of the pin.

5. The fill valve of claim 3 wherein the shank and anti-siphon body are generally cylindrical and the shank fits inside the anti-siphon body.

6. The fill valve of claim 3 wherein the band has at least two pins extending through said window, the pins being axially spaced from one another about the same distance as the axial spacing of adjacent fingers of the same set.

7. The fill valve of claim 2 wherein the track includes an installation portion at one end thereof having no fingers.

8. An adjustable height fill valve for controlling the water level in a storage tank, comprising:

a shank mounted in the tank and connectable to a water supply;

an anti-siphon body telescopically mounted on the shank and adjustable between retracted and extended positions;

a pilot valve mounted on the anti-siphon body in fluid communication with the water supply;

a float mounted in association with the pilot valve to selectively open or close said valve depending on the water level in the tank;

an enclosed track on one of the shank and anti-siphon body defined by first and second spaced axial walls, first and second sets of fingers extending from the first and second axial walls respectively, the fingers of each set being axially spaced from one another and interleaved with the fingers of the other set; and latch on the other of the shank and anti-siphon body, the latch extending into the track where it is releasably engageable with the fingers to adjustably fix the position of the body on the shank between said retracted and extended positions.

9. The fill valve of claim 8 wherein the axial spacing of adjacent first and second fingers is about the same as the size of the pin.

10. The fill valve of claim 8 wherein the latch comprises a band surrounding the anti-siphon body, the anti-siphon body having at least one window therethrough and the band having a pin extending through the window into the track.

* * * * *